United States Patent [19]

Yager

[11] 4,034,478

[45] July 12, 1977

[54] VALVE SEAT CONCENTRICITY GAGE

[75] Inventor: William Henry Yager, Mount Clemens, Mich.

[73] Assignee: The Bendix Corporation, Southfield, Mich.

[21] Appl. No.: 685,209

[22] Filed: May 11, 1976

[51] Int. Cl.² .................... G01B 5/24; G01B 13/19
[52] U.S. Cl. .................... 33/181 AT; 33/174 Q; 33/DIG. 2
[58] Field of Search ........ 33/174 Q, 172 R, DIG. 2, 33/181 AT, 185 V; 73/37.5, 37.9

[56] References Cited

U.S. PATENT DOCUMENTS 2,557,840  6/1951  Preslan .......................... 33/181 AT
2,831,263  4/1958  Mahlmeister ................... 33/DIG. 2

*Primary Examiner*—Harry N. Haroian
*Attorney, Agent, or Firm*—J. R. Benefiel; K. A. Seaman; R. J. Eifler

[57] ABSTRACT

A gage for measuring concentricity between a bore and a countersunk valve seat, said gage having a stem for insertion into the bore and a partially-spherical surface (24) on a spindle member for engaging the valve seat. The spindle member is rotated through 180° to obtain the measurement, while a pair of gaging circuits indicate respective clearances between an upper extension of the stem and the spindle member at the theoretical center of the partially-spherical surface.

2 Claims; 1 Drawing Figure

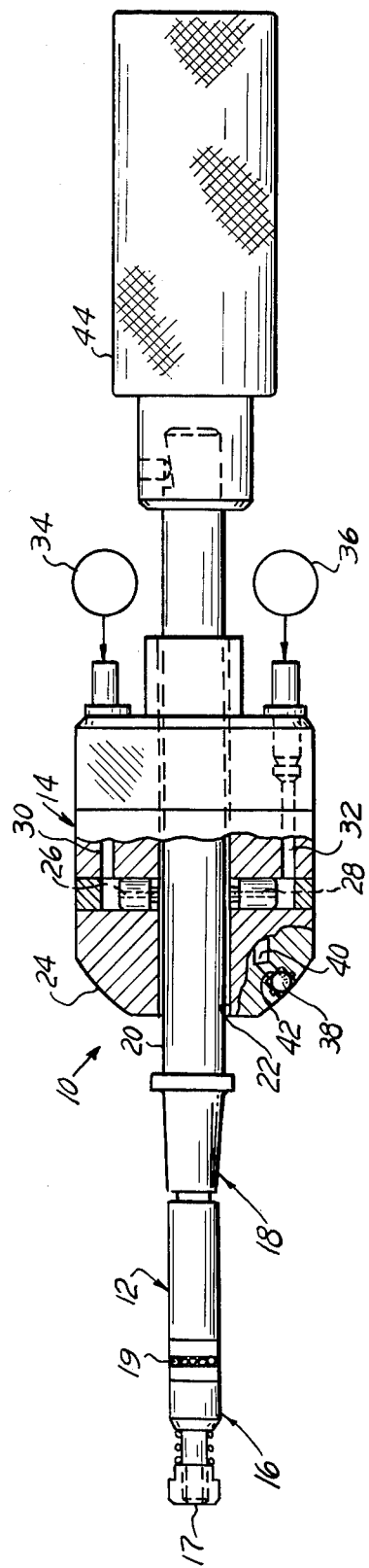

VALVE SEAT CONCENTRICITY GAGE

BACKGROUND OF THE INVENTION

1. Field of the Invention

This invention concerns air gaging and more specifically air gaging fixtures of the type adapted to measure eccentricity between bores and countersunk portions of such bores, such as valve stem holes and valve seats.

2. Description of the Prior Art

In the machining of valve seats and stem holes in cylinder heads for internal combustion engines, various machining errors can produce eccentricity between the stem hole and the valve seat and out-of-square conditions between the centerline of the stem hole and the valve seat and out-of-round conditions of the valve seat, all of which can cause poor seating of the valve in the valve seat creating leakage and poor engine performance, as well as increased emissions levels. These conditions have in the past been detected by means of an arrangement including a solid arbor element located in the valve stem hole and an air spindle slip fit over the solid arbor having air jets arranged to contact the valve seat. If the stem was eccentric with respect to the valve seat, the air spindle would not seat on the valve seat surface and air flow through the jets would indicate an eccentric conditon. The problem with this approach is that a number of error conditons can effect seating of the air spindle and the resulting signals interpreted mistakenly as resulting from eccentricity. That is, if the stem hole is out-of-square with respect to the valve seat or the valve seat itself is out-of-round or there are irregular surface conditions on the valve seat, the air spindle would ride up on the arbor. It should be noted that in order to correct each of these conditions, it would be advantageous to know specifically which of these conditions existed. The object of this invention is to provide such an indication of such eccentricity only, uninfluenced by out-of-round, out-of-square or irregular surface conditions, and also is adapted to independently indicate variations in surface conditions.

SUMMARY OF THE INVENTION

This object is accomplished by means of a gage including an arbor member located within the stem hole and having an air spindle having a partially spherical surface received in the countersink and having circumferentially spaced opposing air gaging orifices located to detect increases or decreases in clearance between the valve stem arbor and a bore formed in the air spindle. The orifices are so located with respect to the center of the spherical surface that out-of-square conditions do not induce eccentricities at the orifices, so that the flow through each orifice indicates eccentricity uninfluenced by the out-of-square, out-of-round or local surface variations in the valve seat as the air spindle is rotated in the valve seat, while a ball jet contacting the valve seat indicates local surface variations during each rotation.

BRIEF DESCRIPTION OF THE DRAWING

The drawing is a partially sectional view along the longitudinal axis of a gage according to the present invention.

DETAILED DESCRIPTION

The following detailed description includes specific terminology and describes a specific embodiment for purposes of clarity. It is to be understood that the invention is not so limited and can take many forms and alternative constructions within its scope.

Referring to the drawing, the concentricity gage 10 includes a stem arbor 12 and a spindle member 14 slidably fit thereover.

The stem arbor 12 includes a lower expandable arbor 16 of the type which includes an axially moveable element 17 moving a plurality of balls 19 radially outwardly to engage the valve stem hole wall and thereby center the stem arbor 12 within the hole.

A detailed description of this subassembly is not here included since devices of this sort are well known in the art and the principle of operation and construction is disclosed in such U.S. Pat. Nos. as 3,100,107; 3,316,649 and 3,862,783.

The stem arbor 12 also includes an upper portion 18 which is tapered to center the stem arbor 12 at the upper portion of the stem hole to thus align the stem arbor with respect to the stem hole.

The spindle member 14 has formed an internal bore 22 sized so that there is a clearance space between it and an upper extension 20 of the stem arbor 12 extending through the bore 22 sufficient to gage the range of permissible eccentricities.

Spindle member 14 has formed thereon a partially spherical surface 24 adapted to be received within the countersink forming the valve seat contacting the countersink at the nominal manufacturing gage line centering itself with respect thereto with the bore 22 extending at a right angle to the plane of contact within the valve seat, the theoretical center of the spherical surface 24 lying on the centerline of the bore 22.

Located within the bore 22 at an axial position even with the center of the spherical surface 24 are a pair of air flow gaging orifices 26 and 28 located at circumferentially spaced positions 180° apart. Orifices 26 and 28 are supplied with regulated air under pressure via internal passages 30 and 32 respectively formed in the spindle member 14, which passages are in turn supplied by air gagin circuits indicated schematically at 34 and 36 respectively. These air gaging circuits 34 and 36 are of a well known type which provide a means for creating and displaying air flow out of the orifices 26 and 28, such air flow in turn bearing linear relationship to the clearance space between the bore 22 and the stem arbor upper extension 26. This provides a gaging means for generating signals corresponding to the clearance space between the stem arbor and the bore 22 at the center of the spindle 14. The details of the construction operation, design considerations, etc. are not recited here since these are all very well known in the art.

Also carried by the spindle member 14 is an arrangement for detecting localized surface variations, this arrangement including a ball jet gaging arrangement including a ball 38 which meters air flow from an internal passage 40 (connected with an air flow gaging circuit of the same type as 34 and 36) urging the ball 38 outwardly from a conical seat 42 to cause it to engage the valve seat wall. The air flow rate thus provides means for indication of localized variations in valve seat surface, since means are thus provided for gaging the distance from the center of the spherical surface and a point contacted by the spherical surface on the countersink.

A knurled knob 44 is provided at the upper end of extension 20 to enable the stem arbor 12 to be inserted in the valve stem hole.

Thus in use, the spindle member 14 is rotated through 180° after such insertion with any eccentricity existing between the spindle member 14 and the stem arbor 12 causing variations in the clearance space which are sensed and displayed by the air flow gaging circuits 34 and 36. The use of two orifices 26 and 28 and circuits 34 and 36 allows the rotation through only 180° rather than 360°

Since the gaging orifices are located at the center of the spherical surface 24, relative tilt of the centerline of the stem arbor caused by out-of-squareness (within limits) does not produce variations in the clearance space at the gaging orifices so that this arrangement yields the desired result described above.

Similarly, the air gaging signal produced by radial movement of the ball 38 is free from such influence.

At the same time, the centering characteristic of the partially spherical surface 24 eliminates the effects of out-of-roundness and local surface variations on the concentricity gaging.

It will be appreciated that many variations of this concept are, of course, possible and other applications than valve seat and stem hole gaging may be useful.

What is claimed is:

1. A concentricity gaging arrangement for gaging eccentricity between centers of a bore and an aligned countersink comprising:
    arbor means including a stem arbor adapted to be aligned with said bore and having an extension portion thereon extending through said countersink;
    a spindle member having an at least partially spherical surface formed thereon and adapted to be received within said countersink, and further having a bore formed therein passing through the center of said spherical surface, said bore adapted to receive said stem arbor extension portion with a clearance space therebetween;
    gaging means generating signals corresponding to the clearance space between said stem arbor extension and said bore in said spindle member at a point even with the center of said spherical surface and at least one point about the circumference of said bore in said spindle member.

2. The gaging arrangement of claim 1 further including means for gaging the distance from said center of said spherical surface and a point contacted by said spherical surface on said countersink.

* * * * *